US010920091B2

(12) United States Patent
Thvedt et al.

(10) Patent No.: US 10,920,091 B2
(45) Date of Patent: Feb. 16, 2021

(54) SHOP PRIMER

(71) Applicant: JOTUN A/S, Sandefjord (NO)

(72) Inventors: Thor Håkon Krane Thvedt, Sandefjord (NO); Håvard Undrum, Barkåker (NO)

(73) Assignee: JOTUN A/S, Sandefjord (NO)

( * ) Notice: Subject to any disclaimer, the term of this patent is extended or adjusted under 35 U.S.C. 154(b) by 166 days.

(21) Appl. No.: 16/073,834

(22) PCT Filed: Jan. 27, 2017

(86) PCT No.: PCT/EP2017/051834
§ 371 (c)(1),
(2) Date: Jul. 30, 2018

(87) PCT Pub. No.: WO2017/129784
PCT Pub. Date: Aug. 3, 2017

(65) Prior Publication Data
US 2019/0382595 A1    Dec. 19, 2019

(30) Foreign Application Priority Data

Jan. 29, 2016 (EP) .................................. 16153504

(51) Int. Cl.
| | | |
|---|---|---|
| C09D 5/12 | (2006.01) | |
| C09D 7/40 | (2018.01) | |
| C09D 7/80 | (2018.01) | |
| C08K 3/08 | (2006.01) | |
| C09D 5/08 | (2006.01) | |
| C09D 5/10 | (2006.01) | |
| C09D 183/04 | (2006.01) | |
| C08K 3/22 | (2006.01) | |
| C08K 3/32 | (2006.01) | |

(52) U.S. Cl.
CPC .................. *C09D 5/12* (2013.01); *C08K 3/08* (2013.01); *C09D 5/084* (2013.01); *C09D 5/106* (2013.01); *C09D 7/70* (2018.01); *C09D 7/80* (2018.01); *C09D 183/04* (2013.01); *C08K 2003/0812* (2013.01); *C08K 2003/0893* (2013.01); *C08K 2003/2241* (2013.01); *C08K 2003/2296* (2013.01); *C08K 2003/321* (2013.01); *C08K 2201/003* (2013.01)

(58) Field of Classification Search
CPC .......... C09D 5/084; C09D 5/12; C09D 5/106; C09D 7/70; C09D 7/80; C09D 183/04; C08K 3/08; C08K 2003/0812; C08K 2003/0893; C08K 2003/2241; C08K 2003/2296; C08K 2003/321; C08K 2201/003

See application file for complete search history.

(56) References Cited

U.S. PATENT DOCUMENTS

| | | | |
|---|---|---|---|
| 4,767,726 A | 8/1988 | Marshall | |
| 5,246,488 A | 9/1993 | Tanaka et al. | |
| 5,580,371 A | 12/1996 | Falberg | |
| 5,883,029 A | 3/1999 | Castle | |
| 5,985,918 A | 11/1999 | Modak et al. | |
| 6,321,750 B1 | 11/2001 | Kelly | |
| 6,468,336 B1 | 10/2002 | Fiedler et al. | |
| 6,719,836 B2* | 4/2004 | Nederlof ................. | C09D 5/106 106/287.11 |
| 7,595,372 B2* | 9/2009 | Lejeune ................. | C09D 5/028 528/12 |
| 8,048,215 B2* | 11/2011 | Davies ..................... | C09D 1/00 106/286.2 |
| 8,128,996 B2* | 3/2012 | Davies ..................... | C09D 1/00 427/372.2 |
| 8,129,028 B2* | 3/2012 | Plehiers ................. | C09D 5/106 428/447 |
| 8,506,719 B2 | 8/2013 | Holappa et al. | |
| 2011/0098397 A1* | 4/2011 | Plehiers .................. | C09D 5/02 524/432 |
| 2011/0268899 A1 | 11/2011 | Albert et al. | |
| 2013/0143034 A1 | 6/2013 | Iijima et al. | |
| 2014/0106176 A1 | 4/2014 | Albert et al. | |
| 2015/0238555 A1 | 8/2015 | Colle et al. | |
| 2020/0181420 A1* | 6/2020 | Undrum ................. | C09D 5/028 |

FOREIGN PATENT DOCUMENTS

| | | |
|---|---|---|
| CN | 1218493 A | 6/1999 |
| CN | 101410438 A | 4/2009 |
| CN | 101506320 A | 8/2009 |
| EP | 1191074 A1 | 3/2002 |
| WO | 03022940 A1 | 3/2003 |
| WO | 2008128932 A1 | 10/2008 |
| WO | 2010125024 A1 | 11/2010 |
| WO | 2013116004 A1 | 8/2013 |

OTHER PUBLICATIONS

Extended European Search Report for European Patent Application No. 16153504.2, dated May 25, 2016, 7 pages.
International Search Report and Written Opinion for International Patent Application No. PCT/EP2017/051834, dated Mar. 31, 2017, 15 pages.

* cited by examiner

*Primary Examiner* — Anthony J Green
(74) *Attorney, Agent, or Firm* — Withrow & Terranova, P.L.L.C.; Vincent K. Gustafson

(57) ABSTRACT

An aqueous shop primer comprising: (A) 25 to 80 wt % of a polysilane sol; (B) 0.5 to 15 wt % of an accelerator selected from at least one of zinc phosphate, zinc oxide, calcium strontium zinc phosphosilicate, zirconium hydrogen phosphate, iron phosphide, calcium zirconate, barium zirconate, zirconium nitride, zinc titanate and iron(II) titanate; (C) 15 to 40 wt % of at least one anticorrosive pigment; (D) 0.5 to 10 wt % microspheres.

22 Claims, No Drawings

SHOP PRIMER

This application is a 35 U.S.C. § 371 national phase filing of International Application No. PCT/EP2017/051834 filed on Jan. 27, 2017, and claims the benefit of European Patent Application No 16153504.2, filed on Jan. 29, 2016, wherein the disclosures of the foregoing applications are hereby incorporated by reference herein in their respective entireties.

This invention relates to a new shop primer composition for application to substrates such as steel. In particular, the invention relates to a shop primer composition comprising a polysilane sol, at least one accelerant such as zinc oxide or zirconium hydrogen phosphate, and microspheres. The shop primer of the invention is fast curing, abrasion resistant, has a low VOC and is weldable. It can also be overcoated with further coating layers without extensive pretreatment and without loss of intercoat adhesion.

BACKGROUND

Shipping containers and other marine metal objects are typically assembled by welding together a number of individual metal components. In marine and industrial construction, it is usually desirable to pre-paint steel with a zinc-containing primer before fabrication, and many such coating compositions, known as shop primers or pre-construction primers, are known. To prevent corrosion during welding, the components are surface prepared (e.g. cleaned and roughened by, for example, shot-blasting) and then coated with shop primer compositions that provide temporary corrosion protection. Such compositions allow primed components to be welded through the shop primer layer without having to remove the primer coating near the weld.

After welding, the primer coating may be over-coated with a primer and optionally, a topcoat to provide extended corrosion protection and the desired aesthetic appearance.

Shop primers can be organic or inorganic and can be supplied in water or in organic solvent. Some shop primer compositions include zinc powder in an organic resin such as an epoxy resin, an epoxy ester, a polyurethane, a polystyrene resin or a silicone resin. Coatings based on these organic binders are not well suited for coating steel that must ultimately be welded because the binder tends to decompose from the heat of the weld, resulting in pores in the weld seams.

With increased environmental awareness, there is also a strong desire to develop improved technology that would allow use of water-based coating systems as shop primers and avoid organic solvent based solutions. In this regard, a leading water borne shop primer technology is based on alkali metal silicates.

Falberg (U.S. Pat. No. 5,580,371) has proposed an example of a zinc-containing primer that provides a durable, corrosion-resistant coating, combined with suitable weldability. The primer comprises zinc, iron phosphide and an aqueous potassium silicate solution.

More recently, U.S. Pat. No. 6,468,336 proposed a silicate based shop primer comprising zinc, micaceous iron oxide and the silicate.

Water borne shop primers based on alkali silicate binders are therefore well known in the market today, and they typically possess many of the vital features required of a shop primer, e.g. in terms of low volatile content, quick drying time, weldability and so on. However, alkali metal silicate based water borne shop primers suffer from one major problem. Alkali metal silicate shop primers are based on sodium, potassium or lithium silicate binders which, in aqueous solution, are very high in pH, usually in the range of pH 11-12. High pH on the surface of the substrate will cause the next coating, usually an epoxy type of paint, to loose adhesion and blister when the system is exposed to water. Any steel primed with an alkali silicate shop primer has to either be removed completely or thoroughly washed repeatedly with fresh water before over coating to circumvent said issues.

Furthermore, alkali silicates require specialised production equipment and application equipment where all parts in contact with the wet paint have to be made out of non-metal materials.

There is a significant need therefore to develop new shop primers that are water borne but do not rely on alkali metal silicates.

The present inventors have devised a water borne shop primer with very low VOC, that dries quickly, gives water resistance quickly, has excellent weldability producing a minimum of pores, weld spatter and weld smoke, has excellent abrasion resistance and can be directly over coated with most paints. The shop primer also resists weathering and can be applied by conventional equipment such as via airless spray.

The shop primer is based on a polysilane binder in conjunction with one or more mineral accelerators in particular, zinc oxide and zirconium hydrogen phosphate. The shop primer of the invention also contains microspheres. It has been surprisingly found that the specific combination of components described in claim 1 gives rise to a composition that meets all the requirements for a shop primer, in particular in terms of drying time, water resistance, abrasion resistance and welding properties and which allows overcoating with new paint layers without the need to remove the shop primer or repeatedly wash the shop primer.

The polysilane binder of use in the shop primer of the invention is not new and is described, inter alia, in U.S. Patent Application Publication Nos. 2011/0268899A1 and 2014/0106176A1. These documents however, primarily consider the structure of the binder rather than target particular shop primer compositions that perform advantageously. The present inventors supplement the knowledge in these documents by identifying particular shop primers that are remarkably useful in the art.

It is appreciated that some compounds such as zinc oxide are sometimes added to shop primers as corrosion inhibitors. The importance, however of certain materials as claimed herein as accelerators is not discussed. The appreciation that only certain accelerators lead to, inter alia, rapid drying and advantageous overcoating, is new. Fast drying is combined with the use of microspheres to improve hardness and reduce pore formation and back burning.

SUMMARY OF INVENTION

Thus, viewed from one aspect the invention provides an aqueous shop primer comprising:

(A) 25 to 80 wt % of a polysilane sol;
(B) 0.5 to 15 wt % of an accelerator selected from at least one of zinc oxide, zinc phosphate, calcium strontium zinc phosphosilicate, zirconium hydrogen phosphate, iron phosphide, calcium zirconate, barium zirconate, zirconium nitride, zinc titanate and iron(II) titanate;
(C) 15 to 40 wt % of at least one anticorrosive pigment;
(D) 0.5 to 10 wt % microspheres. Water present is deemed part of component (A).

Viewed from another aspect the invention provides an aqueous shop primer comprising:
 (A) 2 to 15 dry wt % of a polysilane sol;
 (B) 1.5 to 30 dry wt % of at least one of zinc oxide, zinc phosphate, calcium strontium zinc phosphosilicate, zirconium hydrogen phosphate, iron phosphide, calcium zirconate, barium zirconate, zirconium nitride, zinc titanate and iron(II) titanate;
 (C) 10 to 90 dry wt % of at least one anticorrosive pigment; and
 (D) 0.5 to 15 dry wt % microspheres.

Viewed from another aspect the invention provides an aqueous shop primer comprising:
 (A) 25 to 80 wt % of a polysilane sol;
 (B) 0.5 to 15 wt % of an accelerator selected from at least one of zinc oxide, zinc phosphate, calcium strontium zinc phosphosilicate, zirconium hydrogen phosphate, iron phosphide, calcium zirconate, barium zirconate, zirconium nitride, zinc titanate and iron(II) titanate;
 (C) 15 to 40 wt % of at least one anticorrosive pigment; and
 (E) 1 to 30 wt % of at least one of titanium dioxide or fluorspar. Any water present may be part of component (A).

Viewed from another aspect the invention provides an aqueous shop primer comprising:
 (A) 25 to 80 wt % of a polysilane sol;
 (B) 0.5 to 15 wt % of an accelerator selected from at least one of zinc oxide, zinc phosphate, calcium strontium zinc phosphosilicate, zirconium hydrogen phosphate, iron phosphide, calcium zirconate, barium zirconate, zirconium nitride, zinc titanate and iron(II) titanate;
 (C) 15 to 40 wt % of at least one anticorrosive pigment;
 (D) 0.5 to 15 wt % microspheres; and
 (E) 1 to 30 wt % of at least one of titanium dioxide or fluorspar. Any water present may be part of component (A).

Viewed from another aspect the invention provides a kit comprising at least two parts; a first part (I) comprising component (A) as hereinbefore defined and a second part (II) comprising at least components (B) and (C) as hereinbefore defined. The parts are mixed shortly before application to a substrate. Components (D) and (E) are typically part of component (I). It will be appreciated that the components (I) and (II) will be supplied separately for mixing.

Viewed from another aspect the invention provides a process for protecting a substrate from corrosion comprising applying to that substrate a shop primer composition as hereinbefore defined and allowing said shop primer to cure on said substrate.

Viewed from another aspect the invention provides a substrate coated with a cured shop primer composition as hereinbefore defined.

Viewed from another aspect the invention provides the use of a shop primer as hereinbefore defined to provide temporary corrosion protection to a substrate.

DETAILED DESCRIPTION OF INVENTION

The present invention relates to a shop primer composition which is suitable for application to a substrate to provide temporary corrosive protection to said substrate. The shop primers of the invention can be applied by spraying and possess low VOC and can be thinned with water to achieve an ideal application viscosity. Nevertheless, the shop primers are fast drying and rapidly are able to withstand mechanical abrasion and treatment with chemicals, water and the like. The shop primers of the invention are weldable producing a minimum of weld pores, weld spatter, weld smoke and back burning. Finally, as well as being corrosion resistant, the primers are capable of being overcoated with most types of paint without any extra pre-treatment of the shop primer coat (other than cleaning to remove detritus such as dust, salt and/or grease that have been acquired after shop primer application and prior to applying the next coat).

The shop primer of the invention contains at least one polysilane sol component A.

Component A (The Binder):

The shop primer of the invention composition of the invention contains a polysilane sol component (also known as the binder component) that is capable of curing upon application of the coating composition to a substrate, typically a steel substrate. The polysilane sol component is a component formed by the condensation reaction of at least one silane to form a highly branched polysilane sol which contains a plurality of free silanol functionalities. When this sol is combined with the other components of the coating composition, in particular the accelerator, and applied to a substrate, a coating is formed and the free silanol groups present in the sol form links to groups present on a substrate surface. This curing reaction takes place spontaneously at room temperature to form the shop primer.

The polysilane sol is explicitly a sol rather than a gel. It can be regarded as a solution, a colloidal solution, an emulsion or a suspension. The polysilane is therefore present in an aqueous form before application. The polysilane gels during the curing process upon mixing with the other components of the shop primer.

The polysilane sol of the present invention is ideally derived from at least one alkoxysilane precursor that has been subjected to hydrolysis to form the corresponding silanol. It will be appreciated that in many alkoxysilanes there are multiple alkoxy groups (typically up to three such groups) and hence there are multiple hydrolysis products possible depending on the hydrolysis procedure. Fully hydrolysed and partially hydrolysed products can be formed. This hydrolysis reaction results in the formation of alcohol.

The hydrolysed silanes/partially hydrolysed silanes can then be condensed together as is well known to form complex oligomers/polymers. Due to the various different monomers present when a hydrolysis reaction is effected, a complex polysilane sol forms which cannot be easily characterised by a general formula. For example, due to partial hydrolysis, two partially hydrolyzed molecules can link together in a condensation reaction to form a siloxane and so on. This condensation process obviously causes the formation of alcohol and water by products.

Thus, condensation is associated with the formation of a 2, or 3-dimensional network of siloxane [Si—O—Si] bonds accompanied by the production of water and alcohol species. The polysilane may therefore be linear (2D) or branched (3D). It can be characterised as a oligomeric polysiloxane.

The sols of the invention are therefore not silica sols. Silica sols are stable dispersions of discrete, colloid-size particles of amorphous silica in aqueous solution. Silica sols are generally stable at a pH 7-11.

The polysilane sol of the present invention is typically provided in aqueous form in component (A). Moreover, it is preferably essentially VOC free (volatile organic compounds). It is easy therefore to remove the formed alcohols by evaporation during sol formation. Importantly, as the sol presents with free silanol groups, no further alcohol is liberated on curing keeping VOC content low.

The sol is preferably room temperature curable.

It is preferred if the polysilane sol of the invention is based upon the condensation of at least one bis-aminofunctional alkoxysilane which is subject to hydrolysis or epoxyfunctional alkoxysilane which is subject to hydrolysis. Surprisingly, it was found that stable aqueous, substantially alcohol-free compositions based on silicon compounds can be obtained from bis-aminofunctional alkoxysilanes or epoxyfunctional alkoxysilane optionally together with organofunctional alkoxysilanes. In particular, the sol gel chemistry relies on bis-aminofunctional alkoxysilanes or epoxyfunctional alkoxysilanes together with alkyl-functional alkoxysilanes. The silane compounds are ideally present in substantially completely hydrolyzed form but partially hydrolysed form is also possible. These compositions crosslink at low temperatures.

Thus, the polysilane sol materials of the present invention are preferably based on condensates of bis-aminofunctional alkoxysilanes, such as bis(triethoxysilane)amine or bis(trimethoxysilane)amine. These monomers can be subject to hydrolysis to obtain fully or partially hydrolysed analogues of bis-aminofunctional alkoxysilanes, such as bis(triethoxysilane)amine or bis(trimethoxysilane)amine Epoxyfunctional alkoxysilanes can be subject to hydrolysis to obtain fully or partially hydrolysed analogues as well. Such silanes include 3-glycidyloxypropyltriethoxysilane (GLYEO), 3-glycidyloxypropyltrimethoxysilane (GLYMO).

These treated monomers may be used alone or combined with other monomers to form the sol. Other preferred monomers include bis(triethoxysilane)amine, bis(trimethoxysilane)amine, n-propyltriethoxysilane, n-propyltrimethoxysilane (PTMO), 3-glycidyloxypropyltriethoxysilane (GLYEO), 3-glycidyloxypropyltrimethoxysilane (GLYMO), 3-aminopropyltriethoxysilane (AMEO), 3-aminopropyltrimethoxysilane (AMMO), methacryloxypropyltriethoxysilane (MEEO), methacryloxypropyltrimethoxysilane (MEMO), N-(n-butyl)-3-aminopropyltriethoxysilane, vinyltrimethoxysilane (VTMO), N-(n-butyl)-3-aminopropyltrimethoxysilane (Dynasylan® 1189), 3-mercaptopropyltrimethoxysilane (MTMO), 3-mercaptopropyltriethoxysilane (MTEO), N-2-aminoethyl-3-aminopropyltrimethoxysilanes (DAMO), polyethylene glycol-functionalized alkoxysilanes, tetraethoxysilane (Dynasylan A), tetramethoxysilane (Dynasylan M), methyltriethoxysilane (MTES), methyltrimethoxysilane (MTMS), bis(triethoxysilylpropyl)tetrasulfane (Si 69), bis(triethoxysilylpropyl)disulfane (Si 266), bis(trimethoxysilylpropyl)disulfane, bis(trimethoxysilylpropyl)tetrasulfane, vinyltriethoxysilane (VTEO), 1-aminomethyltriethoxysilyne, 1-aminomethyltrimethoxysilyne, 1-methacryloxymethyltrimethoxysilane, 1-methacryloxymethyltriethoxysilane, 1-mercaptomethyltriethoxysilane, 1-mercaptomethyltrimethoxysilane, isobutyltrimethoxysilane, isobutyltriethoxysilane, octyltriethoxysilane (Dynasylan® OTEO), octyltrimethoxysilane, hexadecyltriethoxysilane, hexadecyltrimethoxysilane, phenyltrimethoxysilane, phenyltriethoxysilane, 2-aminoethyl-3-aminopropylmethyldimethoxysilanes, 2-aminoethyl-3-aminopropylmethyldiethoxysilanes, ureidopropyltrimethoxysilane, ureidopropyltriethoxysilane, tridecafluorooctyltriethoxysilane, tridecafluorooctyltrimethoxysilane, Dynasylan® 1151 (alcohol-free aminosilane hydrolysis product), Dynasylan® HS 2627 (alcohol-free cocondensate of aminosilane and alkylsilane), Dynasylan® HS 2776 (aqueous, alcohol-free cocondensate of diaminosilane and alkylsilane), Dynasylan® HS 2909 (aqueous, alcohol-free cocondensate of aminosilane and alkylsilane), Dynasylan® HS 2926 (aqueous, alcohol-free product based on epoxysilane), and Dynasylan® SIVO 110 (aqueous, alcohol-free product of epoxysilane).

Any of these monomers can also be subjected to hydrolysis to generate hydrolysed or partially hydrolysed monomers for reaction with the bis-aminofunctional alkoxysilanes or epoxyfunctional alkoxysilanes, which may also be hydrolysed or partially hydrolysed. The use of a hydrolysed bis-aminofunctional alkoxysilanes or epoxyfunctional alkoxysilanes along with a non-hydrolysed alkyl alkoxysilane monomer is preferred. A further preferred option is epoxyfunctional alkoxysilanes in combination with aminofunctionalalkoxysilanes.

Epoxyfunctional alkoxysilanes of use in the invention are most preferably epoxyalkylfunctional alkoxysilanes.

The use of epoxyfunctional alkoxysilanes is especially preferred as starting materials for sol formation. Any alkoxy group in the polysilane sol of the invention will preferably have C1-6 carbon atoms, such as C1-4 carbon atoms, especially C1-3 carbon atoms, e.g. methyl, ethyl, n-propyl, i-propyl or n-butyl.

In a most preferred embodiment the sol is formed from a co-condensate based on an w-glycidyloxyalkylalkoxysilane of formula I

$$X\text{---}Si(R)_x(OR^1)_{3-x} \quad (I),$$

wherein X is a 2-(3,4-epoxycyclohexyl)ethyl, 1-glycidyloxymethyl, 2-glycidyloxyethyl, 3-glycidyloxypropyl or 3-glycidyloxyisobutyl group, $R^1$ and R each independently are a linear or branched alkyl group comprising from 1 to 4 C atoms; and x is 0 or 1, or is a bis(alkoxysilylalkyl)amine of formula II

$$(OR^1)_3Si\text{-}A\text{-}Si(OR^1)_3 \quad (II),$$

wherein each $R^1$ independently is a linear or branched alkyl group comprising from 1 to 4 C atoms and A is a bis-aminofunctional group of formula IIa

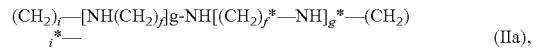

$$(CH_2)_i\text{---}[NH(CH_2)_f]_g\text{-}NH[(CH_2)_{f^*}\text{---}NH]_{g^*}\text{---}(CH_2)_{i^*}\text{---} \quad (IIa),$$

wherein i and i* each independently are an integer of 1, 2, 3 or 4, f and f* each independently are an integer of 1 or 2, and g and g* each independently are an integer of 0 or 1.

To prevent any VOC content alcohol liberated during sol gel formation is distilled off.

Hydrolysis of the starting alkoxysilanes can be effected using formic acid or other mild hydrolysing agent, e.g. as shown in US2011/0268899. The condensation reaction is preferably effected at low pH e.g. less than 7, such as 3 to 5. The reaction time is preferably controlled to ensure formation of a sol rather than a gel. Reaction times might be up to 3 hrs. Too long reaction times may allow a curing reaction to begin. The synthesis of the necessary sol is summarised in US2011/0268899 or US2014/0106176.

Viewed therefore from another aspect the polysilane sol of use in the invention is one that is obtainable by a process comprising:

(i) hydrolysing at least one bisaminofunctional alkoxysilane or epoxyfunctional alkoxysilanes;

(ii) reacting the resulting hydrolysed product with at least one optionally hydrolysed alkylalkoxysilane.

Any alcohol formed can be removed so that the alcohol content of the sol is less than 3 wt %.

Alternatively viewed, the polysilane sol of use in the invention is one that is obtainable by a process comprising hydrolysing a bisaminofunctional alkoxysilane or epoxyfunctional alkoxysilane and allowing the resulting hydrolysed product to self condense to form a sol. Any alcohol formed can be removed so that the alcohol content of the sol is less than 3 wt %.

It will be appreciated that more complex sols can be prepared by adding further reactants into the mix. Whilst therefore there must be at least one bisaminoalkoxysilane or epoxyfunctional alkoxysilane reactant as hereinbefore defined, other possible reactants include vinylsilanes, alkylsilanes, alkoxysilanes and so on.

The ratio of bis-aminofunctional alkoxysilanes or epoxyfunctional alkoxysilanes to alkyl alkoxysilanes may be 10:1 to 1:10, such as 5:1 to 1:5 by wt. The formed sol should be dispersible in water at room temperature of 23° C.

By water dispersible is meant that the sol may form an emulsion, suspension or colloidal solution in water.

It is important that the sol has free silanol groups so that on curing, no further alcohol is released thereby keeping VOC levels low.

Whilst the sols of the invention are provided in water, the polysilanes are often diluted with water before use to achieve an ideal application viscosity. Notably, commercially available polysilanes of use in this invention are available as aqueous solutions.

The polysilane sol (i.e. including the weight of any water in the sol) may form 25 to 80 wt % of the shop primer, such as 25 to 70 wt %, preferably 35 to 65 wt %.

Preferably, the amount of water present in the shop primer of the invention is 10 to 65 wt %, such as 20 to 65 wt % water. The polysilane sol component A typically contains 50 to 98 wt % water, such as 65 to 95 wt % water. Often the solids content of the polysilane sol is 2 to 35% by weight, preferably 5 to 30% by weight. Solids content of the sol is especially 10 to 25 wt %. The sol, which may be purchased from a supplier, may however be diluted by the user as necessary.

The solids content of polysilane in the shop primer as a whole may be 1 to 15 wt %, such as 2 to 12 wt %, especially 4 to 10 wt %.

The water used for dilution is preferably deionized water. Any water used for dilution is, for wt percentage terms, regarded as part of the polysilane sol herein. Whenever percentages of sol are presented in the text, that refers to the weight of sol and water total in the shop primer.

The condensation products formed by the reaction of, inter alia, bis-aminofunctional alkoxysilanes or epoxyfunctional alkoxysilanes and alkyl alkoxysilanes may be oligo/polymeric. Both are termed a polysilane herein. They may have a particle size between 0.5 and 350 nm, or preferably between 0.5 to 130 nm. The weight average molecular weight may range from 1000-150000 g/mol, preferably between 4000 to 30000 g/mol, more preferably between 1000 to 50000 g/mol, even more preferably between 1000 to 5000 g/mol. The viscosity of the polysilane (in water) may be 5 to 20 mPa s at 20° C.

The polysilane component is preferably VOC (volatile organic compounds) free. This means that it contains less than 3 wt % volatile organic compounds (according to ASTM D5201), such as 2 wt % or less, ideally 1 wt % or less. Alternatively, in contains 100 g/L VOCs or less, preferably 40 g/L of VOCs or less.

A polysilane sol should not release further alcohol on crosslinking. Curing of the sol should be possible at temperatures which might be experienced where the substrate is coated, such as 0 to 30° C.

The polysilane sol preferably has a pH of 1.0 to 5.5, such as 3.0 to 5.5. The silane may have a pH range of 3.2-4.0.

The formation of the sol generates cross-linked structural elements, which are chain like, cyclic, or 3D but the structures are difficult to define via way of general formula due to the number of potential structures that form.

The polysilane of use in the invention is not new and these can be purchased from commercial sources. In particular, a polysilane of interest in the invention is available under the trade name Dynosylan Sivo 165. The material is available from Evonik Industries AG (Essen, Germany) It is described as an almost VOC-free waterborne organic-inorganic (hybrid) sol-gel system that cures at relatively low temperature.

The volumetric median particle size is preferably 2 to 10 nm, such as 5.4 nm. Defining the content of the polysilane sol in the shop primer of the invention is difficult as the amounts vary depending on the water content and on the content of anticorrosive material (it is heavy and therefore takes a disproportionate percentage of the weight of the shop primer). The solid binder (i.e. the weight of polysilane solids ignoring water) may form 1 to 35 wt %, such as 2 to 30 wt %, especially 2 to 20 dry wt % of the shop primer. More especially, solids content in the shop primer for the polysilane is 2 to 12 wt %, especially 4 to 10 wt %. These percentages refer to the amount of polysilane calculated as the total of all of the components mixed but ignoring the weight of water (dry weight). Any "dry weight" percentage in the text/claims refers to weight percentages determined ignoring the contribution of water present.

Component B

The water borne shop primers of the invention also contain a mineral accelerator. That accelerator is zinc oxide, zinc phosphate, calcium strontium zinc phosphosilicate, zirconium hydrogen phosphate, iron phosphide, calcium zirconate, barium zirconate, zirconium nitride, zinc titanate and iron (II) titanate.

Most especially, it is zinc oxide or zirconium hydrogen phosphate, or zinc phosphate.

Mixtures of accelerators can also be used. Other mineral compounds can also be present in combination with these two accelerators.

The accelerators above can also be combined with other materials such as metal acetates, metaphosphates, metal titanates, hexafluorzirconates, zirconates and phosphates. The cation is typically Al, Zr, Ba, Ca or Zn.

The amount of accelerator in the compositions of the invention may be 0.5 to 15 wt %, such as 1 to 15 wt %, especially 2 to 12 wt %.

In dry weight terms, component (B) may form 1.5 to 30 dry wt %, such as 3 to 20 dry wt %.

The combination of zirconium hydrogen phosphate and zinc phosphate is a preferred option. The combination of zirconium hydrogen phosphate and zinc oxide is also preferred for component (B). The use of zinc oxide alone as the sole accelerator is also a preferred option.

Without wishing to be limited by theory it has been surprisingly found that these specific accelerators, as opposed to others tested, give rise to excellent drying times and rapid water resistance.

Further Constituents

The shop primer composition of the invention preferably contains a number of further components. The primer must contain an anticorrosive pigment.

In particular, the primer layer composition may comprise extenders such as metal oxides, metal carbonates, feldspar and so on to act as anti-corrosive materials.

It is preferred if the anticorrosive pigment is based on zinc such as pure zinc metal or an alloy of zinc. The zinc used in the composition can be metallic zinc in the form of a powder or flakes, hollow spheres embedded with zinc on the surface, minerals embedded with zinc on the surface, and polymers embedded with zinc on the surface. Alternatively, the zinc can be surface-treated metallic zinc chemically inert to the aqueous environment. Preferably, the zinc has a mean particle size in the range of 0.5-20 microns, such as 1-15 microns, preferably 2-5 microns or 6-9 microns. In particular, the zinc is in the form of zinc powder, especially of the stated particle size ranges. The use of zinc dust as an anticorrosive pigment is well known and its use will be familiar to the person skilled in the art.

The content of anticorrosive pigment in the shop primer of the invention is preferably 15 to 40 wt %, such as 20 to 35 wt %. In dry weight terms, the anticorrosive pigment may represent 10 to 90 wt %, such as 20 to 85 wt %, especially 20 to 80 wt % of the shop primer (dry weight basis).

Microspheres

The shop primer contains microspheres to improve the hardness and weldability of the coating. The term microsphere refers to an essentially spherical particle having a particle size D50 from 100 nm to 50 microns. All kinds of microspheres could be used such as those meeting at least one, such as all, of the specifications given in the table below:

|  | Possible | More preferred | Most preferred |
| --- | --- | --- | --- |
| Hardness (Mohs scale) | ≥5 | ≥6 | ≥7 |
| Crush strength (90% survival) | >5000 psi | >20,000 psi | >60,000 psi |
| Particle size D50[μm] | 1-50 | 2-15 | 4-12 |

Particle size may be determined by e.g. laser diffraction analysis (Malvern).

Preferably, the spheres have a specific surface of ≤7000 $cm^2/g$, preferably ≤6000 $cm^2/g$, preferably ≤5000 $cm^2/g$ (Blaine method EN196-6).

Preferred microspheres will meet all the requirements in the possible column, more preferred column or most preferred column. Microspheres are hard and solid. The actual microspheres can be made of any suitable ceramic. Exemplary ceramics include aluminates, titanates, zirconates, silicates, doped (e.g. lanthanide, and actinide doped) versions thereof, and combinations thereof. Exemplary ceramic particles can be made using techniques known in the art and/or are commercially available. Exemplary ceramic bubbles and ceramic microspheres are described, for example, in U.S. Pat. No. 4,767,726 (Marshall), and U.S. Pat. No. 5,883,029 (Castle). The use of aluminium silicate is especially preferred.

Examples of commercially available ceramic microspheres include ceramic hollow microspheres marketed, for example, by Sphere One, Inc., Chattanooga, Tenn., under the trade name, "EXTENDOSPHERES" (e.g. grades SG, CG, TG, SF-IO, SF-12, SF-14, SLG, SL-90, SL-150, and XOL-200); and solid ceramic microspheres marketed, for example, by 3M Company under the trade name "3M CERAMIC MICROSPHERES" (e.g., grades G-200, G-400, G-600, W-210 and W-410, by Osthoff Omega Group (Norderstedt, Germany) as Omega-SIL, or Zeeospheres (e.g. G-series (G200, G400, G600) or N-series (N200, N400, N600)).

Preferably the ceramic microspheres include both silicates (>10 wt) and aluminates (>10 wt %). A highly preferred microsphere comprises 30 to 70 wt % silicate and 15 to 40 wt % aluminate. The use of microparticles based on silica alone is not preferred. Pure silica microspheres are preferably not present. The microspheres are preferably free of any alkali metal ions. Pure fumed silica particles tend to act as a thixotropic additive giving too much viscosity and thixotropic behaviour to the paint.

Particle size is preferably 1-50 microns, more preferably 2-15 microns, especially 4-12 microns.

The effect of the microspheres is primarily to add hardness and abrasion resistance to the coating composition. Whilst there are alternative hardness improvers such as inorganic fillers, these ceramic microspheres have the additional benefit compared to the alternative hardness improvers that they give a large effect in comparatively small amounts.

It is preferred if the pH of the microspheres is in the range of 9 or less, preferably 8.5 or less (measured in a 10 wt % dispersion of the microspheres in deionised water). pH is preferably above 3 If the pH is >9 we have observed shortening of the shelf life of the paint.

Microspheres may form 0.5 to 10 wt % of the shop primer composition, such as 1 to 7 wt %, especially 2 to 7 wt %. In some embodiment there may be 0.5 to 5 wt % microspheres.

In dry weight terms, microspheres may form 0.5 to 15 dry wt %, such as 2 to 10 wt %.

Other Constituents

The primer layer composition may also contain various other components, e.g. to enhance its anticorrosive properties and so on. In particular, the primer layer composition may comprise extenders to act as welding enhancers. Suitable welding enhancers include titanium dioxide and fluorspar. It has been surprisingly found that these extenders improve the weldablity of the coating. The shop primer containing these extenders suffers from fewer pores, less back burning and low levels of smoke and spatter.

The shop primer composition may comprise 1 to 30 wt % of extender additives, e.g. titanium dioxide and fluorspar, such as 4 to 20 wt %. In dry weight terms, extenders may form 3-50 dry wt %, preferably 8-30 dry wt %, most preferably 12-25 dry wt % The use of titanium dioxide and fluorspar as extenders has been found to be of particular benefit as these materials, as opposed to talc, have been found to give non porous primer coatings without back burning, smoke and spatter.

Colour pigments might also be present, preferably inorganic pigments. Examples of the color pigments include titanium white, iron oxides, chrome oxides and carbon black.

As noted previously, the shop primers of the invention are designed to avoid the problems associated with certain waterborne silicate shop primers. It is therefore preferred if the shop primers of the invention contain no alkali metal silicates, such as lithium silicate, potassium silicate or sodium silicate.

It is also preferred if the shop primer is free of organic solvent.

Addition of one or more thickening agents/thixotropic agents in a ratio of 0.01-10% by wt, such as 0.01-5% by wt, preferably 0.05-2% by wt, of the (wet) composition improves the anti-settling properties, film formation and spraying properties of the shop primer. Examples of suitable thickening agents are bentonite, fumed/colloidal silica, natural thickeners (e.g. alginates), cellulosic thickeners, saccharides, and polysaccharides.

The primer of the invention may also contain other standard additives such as preservatives.

A highly preferred shop primer compositions include:
Component (I):

| Function | Wt % |
|---|---|
| Polysilane binder (incl poss water of dilution) | 25-80 |
| Water of dilution | 0-40 |
| Thixotropic agent | 0-0.5 |
| Preservative | 0-0.5 |
| Welding enhancing extender, TiO2 or fluorspar | 0-20 |
| Coloring | 0-7 |
| Microspheres | 0.5-5 |

Component (II):

| Function | Wt % |
|---|---|
| Anticorrosive pigment | 15 to 40 |
| Accelerator | 0.5 to 15 |

(percentages are based on the combined material)

Composition

The shop primer composition of the invention is formed by mixing the various components. The mixing operation is carried out shortly before the shop primer is applied to a substrate to avoid premature curing. The shop primer is therefore supplied as a two or more component kit for mixing by the user.

Component (I) of such a kit preferably contains the polysilane sol and optionally many of the additives that are conventionally present such as extenders, thickening agents, preservatives, welding enhancers and microspheres. Component (II) comprises components (B) and (C) of the shop primer of the invention, i.e. the accelerator and the anticorrosive pigment.

It is preferred if the composition of the invention (i.e. the mixed shop primer) has a VOC less than 100 g/L, preferably less than 50 g/L, most preferred below less 20, e.g. less than 15 g/L. In one embodiment, the shop primer of the invention is provided in aqueous form. In a second embodiment, the shop primer is provided with an amount of water but is designed to be thinned further before use.

It is preferred if the composition of the invention has a pH of 3 to 5. The composition of the invention when applied preferably dries within 10 minutes at 23° C. 50% RH, preferably within 2 minutes following the test protocols set out in the tests section of the application.

Following the test protocol set out below, it is also preferred if the composition dries through and provides a mechanically abrasion resistant surface within 20 minutes at 23° C. 50% RH, preferably within 5 minutes.

The final primer of the invention is resistant to water. In this regard, it is preferred if the shop primer is water resistant within 6 hours curing time at 23° C. 50% RH, preferably within 4 hours following the test protocols set out in the tests section of the application.

It is important that the shop primer can be welded. The main purpose of the shop primer is to provide temporary corrosion resistance whilst all welding of parts takes place. The shop primers of the invention can be welded on with a speed of at least 70 cm/minute with MIG or similar welding technique producing less than 125 mm$^2$ pores each 1 meter weld. Moreover, welding should produce a minimum of weld spatter, weld smoke and back burning.

It is a final and important goal that the shop primer can be overcoated without any extra pre-treatment of the shop primer coat. It will be appreciated that any surface to be painted is cleaned before overcoating, e.g. to remove dust, salt and/or grease that have been acquired after shop primer application and prior to applying the next coat. That is not a pre-treatment step. In particular, the application of an epoxy primer is possible. Thus, a substrate can be coated with a composition of the invention and then overcoated with epoxy layer.

Coating of the invention can withstand 2 months of weathering showing a rust grade of Ri=0 or 1 according to ISO 4628-3:2003.

The pigment volume concentration (PVC) is an important parameter of the shop primer of the invention. The critical volume concentration is also important. PVC is the volume concentration of pigment. CPVC is the maximum volume concentration of pigment fully covered by the resin. PVC/CPVC>1 means that not all the pigments are covered with resin. The paint will be porous. The ratio is a balance between barrier protection and cathodic protection. Too high ratio results in other issues like popping and cohesion loss. Preferably PVC/CPVC is in the range of 0.8-1.2, more preferably 0.9-1.1, most preferably 0.95-1.05.

Shop primers of the invention are preferably supplied as a kit of two parts. A component (I) comprising the binder and a component (II) comprising the accelerator. The following table gives various exemplary primer solutions—Wt % are given for the combined composition. Binder percentages are based on the weight of the actual polysilane sol and any water present in the primer. The solids content of the binder is typically up to 20 wt % dry solids. The anticorrosive pigment is generally provided as part of the component (II) in any kit of parts.

Some preferred blends are:

| Raw material | 1 Wt % | 2 Wt % | 3 Wt % | 4 Wt % | 5 Wt % |
|---|---|---|---|---|---|
| Component (I) | | | | | |
| Binder, e.g. SIVO 165 + 7 wt % water of dilution | 45 | 45 | 45 | 45 | 45 |
| Bentone LT | 0.25 | 0.25 | 0.5 | 0.25 | 0.25 |
| Sodium benzoate | 0.25 | 0.25 | 0.5 | 0.25 | 0.25 |
| TiO2 | 12 | 12 | 6 | 30 | 4 |
| Fluorspar | | | 6 | | |
| Color pigments | 4 | 4 | 4 | 4 | |
| Omega-SIL S | 4 | 4 | 4 | 4 | 4 |
| Component (II) | | | | | |
| Zinc dust std.7 | 28 | 28 | 28 | 10 | 40 |
| zinc oxide | 6.5 | 3 | | 6.5 | 6.5 |
| Zirconium hydrogen phosphate | | 3.5 | 6 | | |

Applications

The composition of the invention is applicable by all types of application equipment, as brush and roller, conventional spray gun, airless spray and air-assisted airless spray. Ideally, the paint is applied by airless spray to give rise to a shop primer that spontaneously cures on application to the substrate.

The substrate to be coated is preferably a metal substrate, ideally a steel substrate. That substrate may be one that is used in a marine environment. Typical substrates therefore include parts of a ship, metallic containers like shipping containers and so on.

After final mixing, the shop primer is typically applied onto a steel surface ideally to a final thickness of 5-50 microns, such as 15-25 microns. Such a coating will provide a temporary protection to the steel surface.

This being said, the present invention also relates to a method for temporarily protecting a steel surface with an anti-corrosive coating, the method comprising coating the steel surface with a shop primer composition as defined herein.

The thus coated steel surfaces will typically be stored for 2-40 weeks such as up to around 6 months, where after the steel surfaces can be used in the manufacture of steel constructions where the coated steel surfaces are surfaces of steel body parts of which the steel construction is constituted. The steel construction is assembled by welding and importantly, the steel body parts coated with the composition according to the invention can readily be welded to provide high quality junctions between the steel body parts of the steel constructions.

Thus, the present invention also relates to a method for manufacturing a steel construction, said steel construction being constituted by a plurality of steel body parts, said method comprising the steps of:

a) coating at least one of the steel body parts with a shop primer composition according to claim 1;

b) storing the thus coated steel body part(s) for a period of 2-40 weeks;

c) assembling at least a part of the steel construction by welding together at least two of the steel body parts, at least one of said at least two steel body parts being coated as in step (a).

Further steps and details in the manufacturing of a steel construction will be obvious for the person skilled in the art.

The invention will now be described with reference to the following non limiting examples.

Determination of Through-Dry by Mechanical Thumb Test

Alternative through-dry time was tested using mechanical thumb method in accordance with ISO 9117-1 "Paints and varnished—Drying tests—Part 1: Determination of through-dry state and through-dry time". The samples were dried at 23 C/50% RH The through-dry state was defined as the time from application to the point where the rubber disc gave no visible damage to the coating film in accordance with ISO 9117-1. The samples were cured at 23 C/50% RH.

Determination of Adhesion by Pull-Off

The adhesion of the substrate was tested in accordance with ISO 4624:2002. The maximum tensile strength (in MPa) applied to the coating before adhesion failure between coating system and substrate was measured using a portable adhesion tester (PAT) and the nature of the adhesive failure characterized in accordance with ISO 4624, i.e. A, B . . . Z equals cohesive failure and A/B, B/C . . . Y/Z equals adhesive failure.

Determination of Dry Film Thickness (DFT)

Dry film thickness is measured using an elcometer on a smooth steel substrate.

Determination of Solids Content of the Compositions

The solids content in the compositions are calculated in accordance with ASTM D5201.

Calculation of the Volatile Organic Compound (VOC) Content of the Coating Compositions The volatile organic compound (VOC) content of the coating compositions is calculated in accordance with ASTM D5201.

Volume solid measurement was made using OCCA Monograph no. 4.

Example 1

To obtain the required drying and curing speed, a waterborne multifunctional silane binder (SIVO 165, Evonik, 20 wt % solids, 80 wt % water) in conjunction with one or several inorganic minerals as accelerators was used. The SIVO 165 binder is diluted with 7 wt % water based on the weight of the shop primer. The 45 wt % binder includes the water of dilution (38 wt % Sivo 165+7 wt % water of dilution).

The formulation used for accelerator testing is shown in table A. It will be appreciated that the binder is an aqueous polysilane sol.

TABLE A

| Raw material | Amounts [wt %] |
|---|---|
| Binder | 45% |
| Clay based thickener | 0.5% |
| Sodium benzoate | 0.5% |
| Titanium dioxide | 12% |
| Iron oxide black (pigment) | 4% |
| Ceramic microspheres | 4% |
| Zinc dust | 24% |
| Accelerator | 10% |

The accelerator was thoroughly mixed together with the wet paint and applied on sandblasted steel panels (prepared to: Sa 2½ (ISO 8501-1) with a surface profile Fine to Medium G (ISO 8503-2)) using an applicator with 20 µm gap. After 2, 6 and 24 hours, the steel panels were placed in a container with water at 23° C. so that half of the panel was immersed. The panels were immersed for 5 minutes, before a standard water resistance test was performed; a clean woven cotton cloth soaked in water was rubbed back and forth (double rubs) with medium pressure 80 times. The coating and the cotton cloth were then evaluated before setting a water resistance value from 0 to 5, where 4 is regarded as water resistant, and 5 is completely water resistant, or fully cured. For a value of 4 the rubbed area has slight burnished appearance, and there is slight amount of zinc on cloth.

| Accelerator | 2 h | 6 h | 24 h | Comments: |
|---|---|---|---|---|
| None | 0 | 2 | 4 | |
| Barium zirconate* | 3 | 4 | 4 | |
| Potassium hexafluorozirconate | 1 | 2 | 3 | |
| Calcium zirconate* | 2 | 4 | 4 | |
| Lithium zirconate | 1 | 2 | 4 | |
| Iron phosphide* | 2 | 4 | 5 | |
| Iron(II) titanate* | 3 | 3 | 3 | |
| Zinc titanate* | 3 | 3 | 4 | |
| Aluminium titanate | 1 | 2 | 3 | |
| Aluminium metaphosphate | 2 | 2 | 4 | |
| Aluminium dihydrogen phosphate | — | — | — | Violent reaction |
| Aluminium dihydrogen phosphate (0.5%)** | 2 | 3 | 4 | |
| Zirconium hydrogen phosphate* | 3 | 4 | 4 | |
| Calcium strontium zinc phosphosilicate* | 2 | 4 | 5 | |

-continued

| Accelerator | 2 h | 6 h | 24 h | Comments: |
|---|---|---|---|---|
| Zirconium (Iv) hydroxide | 2 | 3 | 4 | |
| Ammonium carbonate | — | — | — | Gelled after 5 minutes |
| Ammoninium carbonate (0.5%)** | 0 | 2 | 3 | |
| Zirconium (IV) acetylacetonate | — | — | — | Gelled after 1 minute |
| Zirconium (IV) acetylacetonate (0.5%)** | 1 | 1 | 2 | |
| Zirconium (IV) oxynitrate hydrate— | — | — | — | Gelled after 1 minute |
| Zirconium(IV) oxynitrate hydrate (0.5%) | 2 | 3 | 5 | |
| Zirconium nitride* | 3 | 3 | 4 | |
| Zinc chloride | 0 | 0 | 0 | |
| Zinc phosphate* | 3 | 4 | 5 | |
| Zinc oxide* | 3 | 4 | 5 | |
| Copper oxide | 2 | 3 | 4 | |
| Glass flakes | 1 | 2 | 3 | |
| Wollastonite | 2 | 3 | 4 | |
| Portland cement | — | — | — | Gelled after 5 minutes |
| Portland cement (0.5%)** | 2 | 2 | 4 | |

*Of the invention
**a violent reaction/ fast gelling occurred at 10 wt % accelerator addition.
Experiment repeated with 0.5 wt % accelerator (to compensate, more titanium oxide added (additional 9.5 wt %)

Even without accelerator, the coating becomes water resistant after 24 hours. However, to obtain water resistance within 6 hours, one has to use an accelerator. Out of the different possible accelerators tested, the following showed water resistance after 6 hours; zinc oxide, zinc phosphate, calcium strontium zinc phosphosilicate, zirconium hydrogen phosphate, iron phosphide, calcium zirconate and barium zirconate. Moreover, several of the accelerators showed significant potency with a water resistance value of 3 after only two hours; zirconium nitride, zinc oxide, zinc titanate, zirconium hydrogen phosphate and iron(II) titanate. All accelerators could be used either alone or in a mixture. Due to the reactivity of the accelerators with the binder, they are a part of the dry component (II) together with zinc dust.

Example 2

Addition of Welding Agent

Excellent weldability was obtained by using high amounts (10-20 weight %) of either titanium dioxide (TiO$_2$) or fluorspar, or a combination of these:

TABLE B

| Raw material | 1* wt % | 2 wt % | 3 wt % | 4* wt % | 5* wt % | 6* wt % |
|---|---|---|---|---|---|---|
| Component (I) | | | | | | |
| Binder total | 47 | 47 | 49 | 43 | 43 | 43 |
| Made from SIV0165 + Additional Water | 36 + 11 | 36 + 11 | 37 + 12 | 33 + 10 | 33 + 10 | 33 + 10 |
| Bentone LT | 0.35 | 0.35 | 0.35 | 0.35 | 0.35 | 0.35 |
| Sodium benzoate | 0.15 | 0.15 | 0.15 | 0.15 | 0.15 | 0.15 |
| TiO2 | | | | 20 | 16 | 10 |
| Fluorspar | 18 | | | | | 10 |
| Talc | | 16 | 11 | | | |
| Color pigments | | | | | 4 | |
| Ceramic microspheres | 3 | 2 | 2 | 3 | 3 | 3 |

TABLE B-continued

| Raw material | 1* wt % | 2 wt % | 3 wt % | 4* wt % | 5* wt % | 6* wt % |
|---|---|---|---|---|---|---|
| Component (II) | | | | | | |
| Zinc dust | 15 | 18 | 20 | 18 | 18 | 18 |
| Zinc oxide | 5.5 | 5.5 | 5.5 | 5.5 | 5.5 | 5.5 |
| Results: | | | | | | |
| PVC/CPVC | 0.93 | 0.95 | 0.89 | 0.96 | 0.97 | 0.83 |
| Zinc dust in dry film [wt %] | 30 | 35 | 40 | 30 | 30 | 30 |
| Pores | Some | Extreme | Extreme | None | None | Some |
| Back burning | Medium | Medium | Heavy | Very light | Very light | Light |
| Smoke and spatter | Low levels | High levels | High levels | Low levels | Low levels | Low levels |

*Preferred shop primers

Shop primer compositions were applied on a sandblasted steel panels (prepared to: Sa 2½ (ISO 8501-1) with a surface profile Fine to Medium G (ISO 8503-2)) using an applicator with 20 μm gap.

Example 3

Addition of Microspheres

TABLE C

| Raw material | wt % | wt % |
|---|---|---|
| Component (I) | | |
| Binder | 46 | 46 |
| Made from SIVO 165 + water of dilution | 39 + 7 | 39 + 7 |
| Bentone LT | 0.25 | 0.25 |
| Sodium benzoate | 0.25 | 0.25 |
| TiO2 | 10 | 15 |
| Color pigments | 4 | 4 |
| Microspheres# | 5 | 0 |
| Component (II) | | |
| Zinc dust std.7 | 29 | 29 |
| Accelerator | 5.5 | 5.5 |

W-410 or OmegaSIL-S

Shop primer compositions were applied on a sandblasted steel panels (prepared to: Sa 2½ (ISO 8501-1) with a surface profile Fine to Medium G (ISO 8503-2)) using an applicator with 20 μm gap. To obtain proper abrasion resistance and hardness, solid ceramic microspheres comprising aluminium silicate with a particle distribution of 4-10 μm was used in the formulation in 5 weight % of the total formulation. Without said microspheres, the coating showed a pencil hardness of about HB, and with the microspheres the hardness increased to 3H with the microspheres.

W-410 is a white grade solid ceramic microspheres from 3M, with a density of 2.4 kg/L and D50 particle distribution at 4 μm. OmegaSIL-S from Osthoff Omega Group, has a density of 2.48 kg/L and D50 particle distribution at 4.4 μm, Both showed that the weldability was significantly improved with less pore formation and less back burning.

Example 4

Carbon steel panels prepared as described in Example 1 were coated with a shop primer using an applicator with 20 μm gap. Two different shop primers were used:
SP=shop primer of the invention in Example 3 with OmegaSIL-S microspheres
Alkali silicate shop primer is a water based alkali silicate shop primer, Muki Z WB-14 commercially available from Jotun A/S.

After application of the shop primer they were allowed to cure at 23° C. and 50% RH for 24 hr before they were recoated with an epoxy primer, Penguard express, commercially available from Jotun A/S. The samples were thereafter cured for 4 days at 23° C. and 50% RH before Example 1 and 2 was exposed in fresh water at 23° C. for 1 week. The systems in Example 3 and 4 were not exposed to water.

The panels were tested;
X-cut according to ISO 16276-2:2007. Judged according to a scale from 0 (perfect) to 5 (poor)
Pull off according to ISO 4624:2002.
Blisters according to ISO 4628-2
Testing adhesion of systems with epoxy primer and shop primer

TABLE D

| Ex. | System | Tot. DFT [μm] | DFT [μm] 1st coat | DFT [μm] 2nd coat | Adhesion [MPa] | Fracture type | Cross cut | Blister |
|---|---|---|---|---|---|---|---|---|
| 1 | SP + Epoxy | 131 | 21 | 110 | 7.7 | BC80% XZ20% | 1 | No |
| 2 | Alikali silicate + Epoxy | 130 | 20 | 110 | 0.7 | C90% CX10% | 4 | 2 (S3) |
| 3 | SP + Epoxy | 131 | 21 | 110 | 5.3 | C90% CX10% | 0 | No |
| 4 | Alkali silicate + Epoxy | 130 | 20 | 110 | 4.7 | C90% CX10% | 0 | No |

Accepted criteria for a shop primer overcoated with an epoxy and immersed in fresh water:
Adhesion values with Pull-off should be similar to reference.
Adhesion values with X-cut should be similar to reference.
No defects as corrosion or blisters should be visible.

A traditional alkali silicate shop primer overcoated with a traditional epoxy primer clearly show blisters after immersion in fresh water. The x-cut and pull off adhesion is dramatically reduced. This is obviously not an acceptable shop primer for this purpose.

The new waterborne multifunctional silane shop primer overcoated with a traditional epoxy primer has no blisters or reduced adhesion values. This shop primer can be overcoated and immersed without losing integrity.

The invention claimed is:

1. An aqueous shop primer comprising:
    (A) 25 to 80 wt % of a polysilane sol;
    (B) 0.5 to 15 wt % of an accelerator selected from at least one of zinc phosphate, zinc oxide, calcium strontium zinc phosphosilicate, zirconium hydrogen phosphate, iron phosphide, calcium zirconate, barium zirconate, zirconium nitride, zinc titanate and iron(II) titanate;
    (C) 15 to 40 wt % of at least one anticorrosive pigment comprising pure zinc or a zinc alloy; and
    at least one of the following items (D) or (E):
        (D) 0.5 to 15 wt % microspheres; or
        (E) 1 to 30 wt % of at least one of titanium dioxide or fluorspar.

2. The aqueous shop primer of claim 1, comprising 0.5 to 10 wt % microspheres.

3. The aqueous shop primer of claim 1, comprising 1 to 30 wt % of at least one of titanium dioxide or fluorspar.

4. The aqueous shop primer of claim 1, comprising 0.5 to 15 wt % microspheres, and 1 to 30 wt % of at least one of titanium dioxide or fluorspar.

5. The aqueous shop primer of claim 1, wherein the polysilane sol comprises a 2-dimensional or 3-dimensional network of siloxane [Si—O—Si] bonds.

6. The aqueous shop primer of claim 1, wherein the polysilane sol is obtainable produced by a process comprising a condensation reaction of (i) at least one bis-aminofunctional alkoxysilane which is subject to hydrolysis or (ii) epoxyfunctional alkoxysilane which is subject to hydrolysis.

7. The aqueous shop primer of claim 1, wherein the polysilane sol is produced by a process comprising:
    (i) hydrolysing at least one bisaminofunctional alkoxysilane or epoxyfunctional alkoxysilane to form a hydrolysed product; and
    (ii) reacting the hydrolysed product with itself, with at least one optionally hydrolysed alkylalkoxysilane, or with at least one optionally hydrolysed aminofunctional alkoxypolysilane.

8. The aqueous shop primer of claim 1, being free of alkali metal silicate.

9. The aqueous shop primer of claim 1, comprising aluminate-containing microspheres.

10. The aqueous shop primer of claim 1, wherein said accelerator comprises zinc oxide or zirconium hydrogen phosphate.

11. The aqueous shop primer of claim 1, comprising at least one of the following features (i) or (ii):
    (i) the polysilane sol comprises 2 to 35 wt % solids content, or
    (ii) polysilane is present in the aqueous shop primer as a whole with a solids content of 1 to 15 wt %.

12. The aqueous shop primer of claim 1, being free of organic solvent.

13. The aqueous shop primer of claim 1, having a pH in a range of from 3 to 5.

14. A process for protecting a substrate from corrosion utilizing the aqueous shop primer of claim 1, the process comprising:
    applying the aqueous shop primer to at least one surface of the substrate; and
    allowing the aqueous shop primer to cure on the at least one surface.

15. A substrate produced according to the process of claim 14.

16. A kit for forming a shop primer, the kit comprising separate first and second components that are combinable to form the shop primer, wherein:
    the first component comprises (A) polysilane sol in an amount sufficient to constitute 25 to 80 wt % of the shop primer, and (B) an accelerator selected from at least one of zinc phosphate, zinc oxide, calcium strontium zinc phosphosilicate, zirconium hydrogen phosphate, iron phosphide, calcium zirconate, barium zirconate, zirconium nitride, zinc titanate and iron(II)

titanate, in an amount sufficient to constitute 0.5 to 15 wt % of the shop primer; and the second component comprises at least one anticorrosive pigment comprising pure zinc or a zinc alloy, in an amount sufficient to constitute 15 to 40 wt % of the shop primer.

17. An aqueous shop primer comprising:
(A) 2 to 15 dry wt % of a polysilane sol;
(B) 1.5 to 30 dry wt % of at least one of zinc phosphate, zinc oxide, calcium strontium zinc phosphosilicate, zirconium hydrogen phosphate, iron phosphide, calcium zirconate, barium zirconate, zirconium nitride, zinc titanate and iron(II) titanate;
(C) 10 to 90 dry wt % of at least one anticorrosive pigment comprising pure zinc or a zinc alloy; and
(D) 0.5 to 15 dry wt % microspheres.

18. The aqueous shop primer of claim 17, wherein the polysilane sol comprises a 2-dimensional or 3-dimensional network of siloxane [Si—O—Si] bonds.

19. The aqueous shop primer of claim 17, being free of alkali metal silicate.

20. The aqueous shop primer of claim 17, further comprising titanium dioxide or feldspar.

21. The aqueous shop primer of claim 17, wherein said microspheres comprise aluminate-containing microspheres.

22. The aqueous shop primer of claim 17, having a pH in a range of from 3 to 5.

* * * * *